(12) United States Patent
Laur

(10) Patent No.: US 6,178,609 B1
(45) Date of Patent: Jan. 30, 2001

(54) ROTARY PALLET CHANGER FOR MACHINE-TOOL

(75) Inventor: Raymond Laur, Viviers les Montagnes (FR)

(73) Assignee: Renault Automation, Boulogne-Billancourt (FR)

( * ) Notice: Under 35 U.S.C. 154(b), the term of this patent shall be extended for 0 days.

(21) Appl. No.: 09/284,246

(22) PCT Filed: Oct. 10, 1997

(86) PCT No.: PCT/FR97/01806

§ 371 Date: Apr. 15, 1999

§ 102(e) Date: Apr. 15, 1999

(87) PCT Pub. No.: WO98/17436

PCT Pub. Date: Apr. 30, 1998

(30) Foreign Application Priority Data

Oct. 17, 1996 (FR) .................................... 96 12925

(51) Int. Cl.$^7$ ................ B23Q 5/26; B23C 9/00; B65G 47/90
(52) U.S. Cl. ...................... 29/33 P; 29/DIG. 56; 29/DIG. 94; 148/345.3; 148/346.1; 409/134; 409/164
(58) Field of Search .................... 29/33 P, 563, 29/564, DIG. 56, DIG. 94, DIG. 101; 409/164, 134; 198/346.1, 339.1, 345.3, 465.3; 483/3

(56) References Cited

U.S. PATENT DOCUMENTS

| 4,373,406 | * | 2/1983 | Piotrowski | 198/346.1 |
|---|---|---|---|---|
| 4,797,052 | * | 1/1989 | Ohta et al. | 29/33 P |
| 4,797,990 | * | 1/1989 | Yamaguchi et al. | 198/339.1 X |
| 4,823,933 | * | 4/1989 | Hashimoto et al. | 198/465.3 |
| 5,099,980 | * | 3/1992 | Babel | 198/346.1 |
| 5,189,774 | * | 3/1993 | Hofmann | 198/345.3 |
| 5,261,147 | * | 11/1993 | Wood III | 29/33 P |
| 5,265,497 | * | 11/1993 | Curless | 29/33 P |

FOREIGN PATENT DOCUMENTS

| 228961A | * | 10/1985 | (DE) | 29/563 |
|---|---|---|---|---|
| 53-146304 | * | 12/1978 | (JP) | 29/33 P |
| 59-169738 | * | 9/1984 | (JP) | 409/164 |
| 240261 | * | 9/1989 | (JP) | 29/33 P |
| 404201163 | * | 7/1992 | (JP) | 29/563 |

* cited by examiner

*Primary Examiner*—William Briggs
(74) *Attorney, Agent, or Firm*—Oblon, Spivak, McClelland, Maier & Neustadt, P.C.

(57) ABSTRACT

A rotary device for changing parts to be machined by a machine-tool. The device includes a supporting table which has at least two pallet supports arranged at regular angular intervals for receiving each a part-carrying pallet, and is rotationally mounted between the machining station of the machine-tool and the post for supplying part-carrying pallets arranged opposite said machining station. The supporting table is pivotally mounted about its central axis and tiltingly between a horizontal position and an inclined position relative to the horizontal plane. The invention is useful for changing parts for a machine-tool.

12 Claims, 4 Drawing Sheets

ROTARY PALLET CHANGER FOR MACHINE-TOOL

BACKGROUND OF THE INVENTION

1. Field of the Invention

The present invention relates to the field of machine tools and in particular to modifications allowing the changing of parts to be machined while meeting the integration requirements needed more particularly in the use of a machine tool for high speed machining.

2. Discussion of the Background

Usually, the changing device called "palletization" is used for supplying machine tools with parts to be machined: the device brings the part to be machined on the machining tool machining station, the machine tool works the machining range then the machined part to be machined is retrieved and replaced by a new part to be machined for machining.

The known devices called "step by step" are very much adapted for production line machining and to the configuration for machining machine tools for mass production. These machines contain multi-spindle tool heads which ensure the realisation at a very high speed of a range of machining.

These machine tools being subject to constant improvement in speed and precision and due to the fact that more flexible, faster and more precise new mono-spindle machines are appearing, the known devices are difficult to adapt as it is essential in future that they become more flexible, faster and more precise. In fact, the increased flexibility of these machines brings, amongst others, a difference in machining time from one machine to another and the technical procedure of conveying "step by step" cannot be used in such a configuration.

Another constraint to which a changing tool device must now adapt is dry machining. In fact, dry machining, that is to say without liquid projection, does away with the common removal means of chips so that these chips are evacuated with more difficulty and become therefore a more important factor in seizing the components of the machine, of distorsion of the references and of malfunction.

The concept of rotary "palletization" devices in front of each machine and being used as interface between the classical conveying chain of the parts and a high speed machining machine tool, seems to be the best solution to the problem of flexibility. However, a disadvantage of these devices is the high free volume required, at the level of the machining station, by its installation, as the rotation of these devices requires a cylindrical volume of which the base would have for diameter the length of the pallet-changer, taking much more space than a classical palettizer in translatory motion. This disadvantage has often forced the tool office technicians to conceive less space-taking machining assemblies.

The problem of leaktightness, and in particular during dry machining, is more complex for rotary pallet-changers as they bring a pallet in a machining zone by a high speed rotating movement which is difficult to get leaktight, due to the fact that the entire surface of the pallet-changer resting on the machine tool becomes an obstacle at the time of the rotation of said pallet-changer. The leaktightness of existing devices, when it exists, is not always a satisfactory and acceptable compromise in view of the conditions required nowadays for very high speed machining.

SUMMARY OF THE INVENTION

Taking this into account, the Applicant has carried out research on parts changing pallet-changers which has resulted in a new concept of rotary device ensuring the changing of parts to be machined of a machine tool, in the best conditions of leaktighness, speed and space taking.

The rotary device for changing parts to be machined by a machine tool of the invention is of the type of the one constituted by a table which, comprising at least two pallet supports arranged preferably at regular angular intervals to each receive a part-carrying pallet, which is mounted rotating between the machining station of the machine tool and the post for supplying part-carrying pallets arranged opposite the said machining station.

According to the fundamental concept of the invention, such a device is remarkable in that the aforesaid pallet supporting table is mounted on one hand, pivoting about its central axis and on the other hand, tilting between a horizontal position and an inclined position relative to the horizontal plane. This characteristic has the great advantage to move the elements integral with the table, introduced in the machining station, towards the centre of the rotary device in order to free said machining station, to be able to realize the free rotation of the table. The tilting of the plate brings a vertical and horizontal movement of the end of the table introduced in the machining station which allows to sufficiently free the table from the machining station to start a rotation.

According to a particularly advantageous characteristic of the invention, the pallets supporting table of the said device is mounted tilting between the machining station of the machine tool and the supplying station of the part-carrying pallets, about a theoretical horizontal axis arranged orthogonally to the axis alignment of the said stations. Thus, the tilting is effected from bottom to top and from top to bottom, allowing the use of a standard clamping module including references which are used to position the pallets on which the parts are clamped through a classical machining assembly. Another not-unimportant advantage of the tilting of the table of the rotary device for changing the parts of the invention, is to free enough elements linked to the table introduced in the machine tool machining station to ensure their rotation, so that the elements integral with the turning ensemble can rest on the machine.

According to another particularly advantageous characteristic of the invention, the pallets supporting table of the aforesaid device is mounted tilting from its horizontal resting position where a pallet is positioned on the references of the clamping module of the machine tool machining station, to an inclined position above the said clamping module where the pallet is freed of the said references. Furthermore, the rotation movement of the said table is advantageously operated during the inclined position of the said table. Unlike classical "palletization" devices, the tilting of the whole table with pallet has a freeing effect allowing to make it pivot without decreasing the dimensions of the machining assembly ensuring the tightning of the part. Furthermore, in freeing the different elements of the table of the machining station before rotation, the tilting of the table allows to keep the tool magazine essential to the optimal functionning of the machine tool near the machining station without interfering with the rotation movement. Thus, after machining, the table tilts so as to free the part carrying pallet of the references of the clamping module of the tool machine to allow, without impediment, the rotation of the table which positions a new pallet above the references while making the pallet go from the machined part to the loading/unloading station. Once this rotation carried out, the table then goes back into a horizontal position so as to allow the positioning and the clamping of the new pallet and the unloading the old one.

According to another particularly advantageous characteristic, the aforesaid theoretical horizontal axis follows a movement of which the direction is parallel to the vertical plane running through the alignment axis of the said posts. The mobility of this theoretical axis allows to offer an instantaneous centre of rotation to the table so that the freeing of the parts of the machining station can start following a slightly vertical path, which allows the use of all sorts of references on the clamping module. Furthermore, the freeing path can be optimized according to the needs and obstacles, existing and to come, during the rotation of the pallets support table and the tilting can be reduced thanks to the interval of the axis.

Advantageously, the aforesaid theoretical horizontal axis around which the aforesaid table tilts, is situated near the aforesaid supplying post thus allowing a curvature range larger at the level of the machining station than if the rotation axis was situated in the centre of the table.

The tilting of the table and the freeing it creates, have for another great advantage to allow to equip the table with a cover comprising on one hand, a lower part ensuring complete protection of the table while leaving the pallet supports free and on the other hand, an upper part defining a protection shield around the said pallet supports and fitted with openings to authorize access to each pallet support on its vertical walls destined to face the machining station. This cover, which will be developed in the description based on the drawings, has for main function to avoid projection of chips on the parts and on the clamping mechanism.

According to another particularly advantageous characteristic of the invention aiming to improve the safety conditions and the automation, the connection and disconnection of the circuits used for the clamping of the pallet are subject to the tilting movements of the aforesaid table for changing the parts.

The fundamental concepts of the invention having been exposed hereinabove in their most elementary form, more details and characteristics of the invention, will come out more clearly when reading the description hereinafter using, as a non limitative example and having regards to the attached drawings, an embodiment of a rotary device for changing parts to be machined by a machine tool according to the invention, comprising for illustration purposes two pallet supports.

DETAILED DESCRIPTION OF THE PREFERRED EMBODIMENTS

Figure 1:
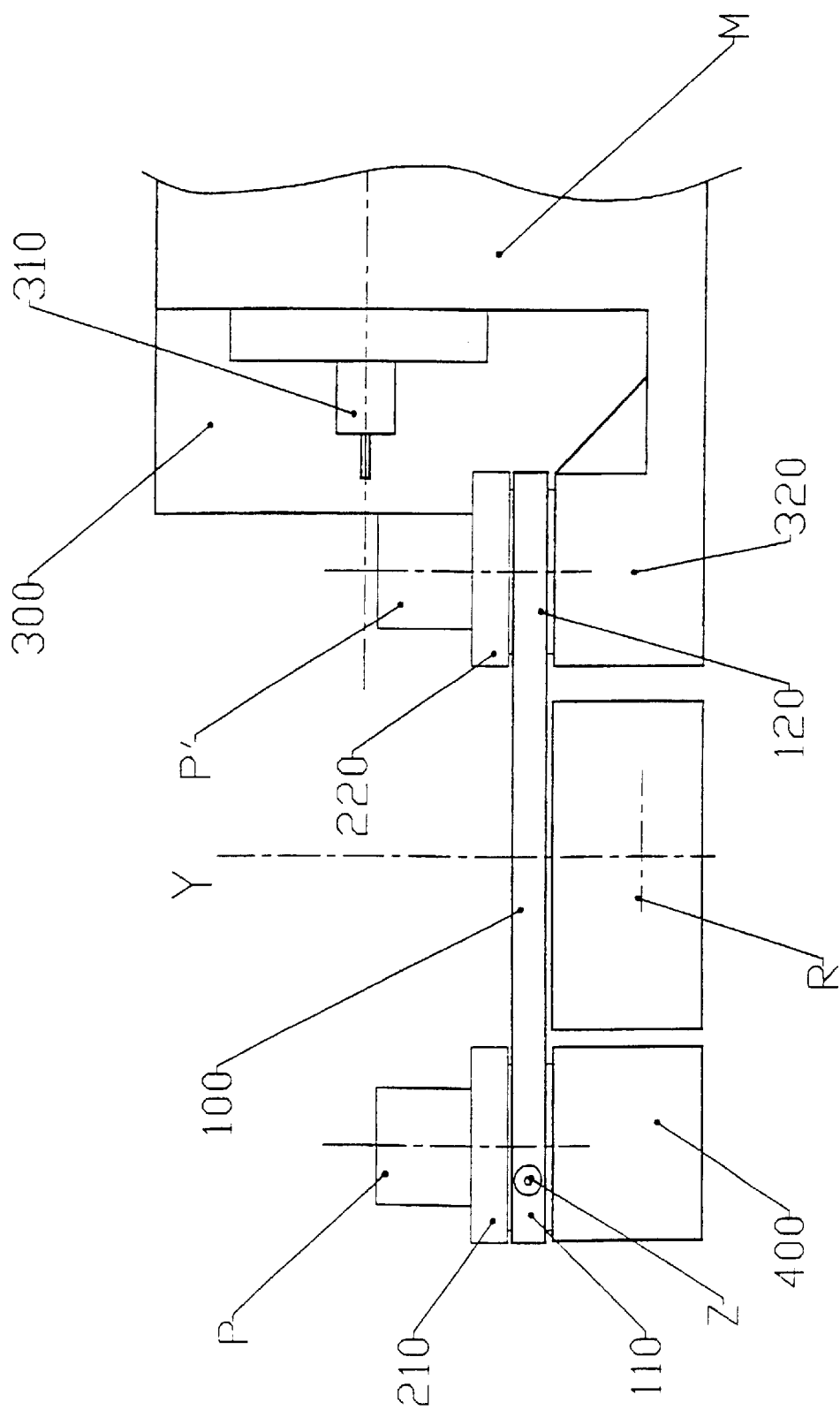
FIG. 1 is a schematic side view of such a rotary device for changing parts to be machined by a machine tool, in horizontal position.

As shown on the drawing of FIG. 1, the rotary device for changing parts to be machined of the invention referenced as R as a whole is constituted by a table 100 comprising two pallet supports 110 and 120 arranged at 180° one from another and which are destined to receive two part-carrying pallets 210 and 220 on which two parts to be machined P and P' are mounted via a clamping assembly. This rotary device R is situated between on one hand, the machining station 300 of a machine tool referenced as M as a whole and comprising a ram carrying an electric spindle 310 and a clamping module 320, and on the other hand, a supplying post of the part-carrying pallets illustrated by its dropping module 400.

Figure 2:
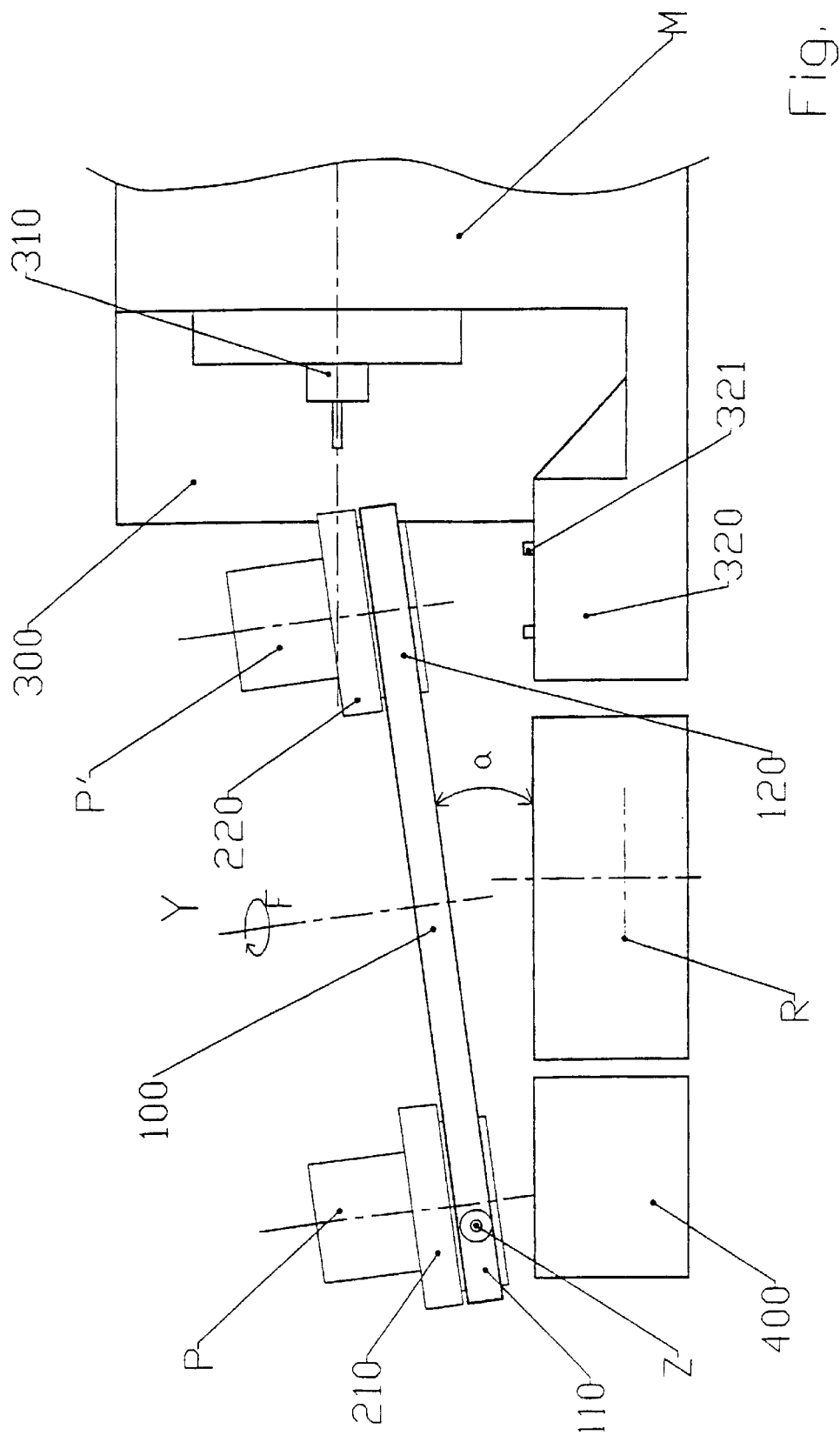
FIG. 2 is a schematic side view of the rotary device of FIG. 1, in inclined position.

According to the main characteristic of the invention, the pallets support table 100 is mounted on one hand pivoting about its central axis Y and on the other hand tilting between a horizontal position as shown on FIG. 1 and an inclined position in relative to the horizontal illustrated on FIG. 2. The aforesaid table 100 is mounted tilting at an angle "a" between the machining station 300 and the dropping module of the pallets supplying post, about a theoretical horizontal axis Z arranged orthogonally to the alignment axis of the said posts.

This theoretical axis, situated near the dropping module 400, follows a movement (arrow V) having the direction parallel to the vertical plane running through the alignment axis of the said posts, so as to ensure a path of tilting optimised to table 100 allowing said table 100 a start of vertical freeing. This elevation and tilting path allows the aforesaid table 100 to tilt from its resting horizontal position where a pallet 220 is positioned on the references 321 of clamping module 320 so that machine tool M can machine the part P' (see FIG. 1) towards an inclined position of an angle "a" above said clamping module 320 where pallet 220 is freed from references 321 and where the support 120 of table 100 with the part-carrying pallet 220, on which part P' having been machined is mounted, are freed enough.

Once the inclination angle "a" is reached, table 100 carries out a 180° rotation following arrow F (see FIGS. 2 and 3) about which the said central axis Y inclined at an angle "a" so that part-carrying pallet 220 carrying the machined part P' comes into position above the dropping module 400 to unload and that part-carrying pallet 210 carrying the part to be machined P comes into position above the clamping module 320 of machining station 300, so that when the "return" tilting is taking place, part-carrying pallet 210 is clamped on references 321 and pallet 220 is discharged to load a pallet with a new part to be machined.

Figure 3:
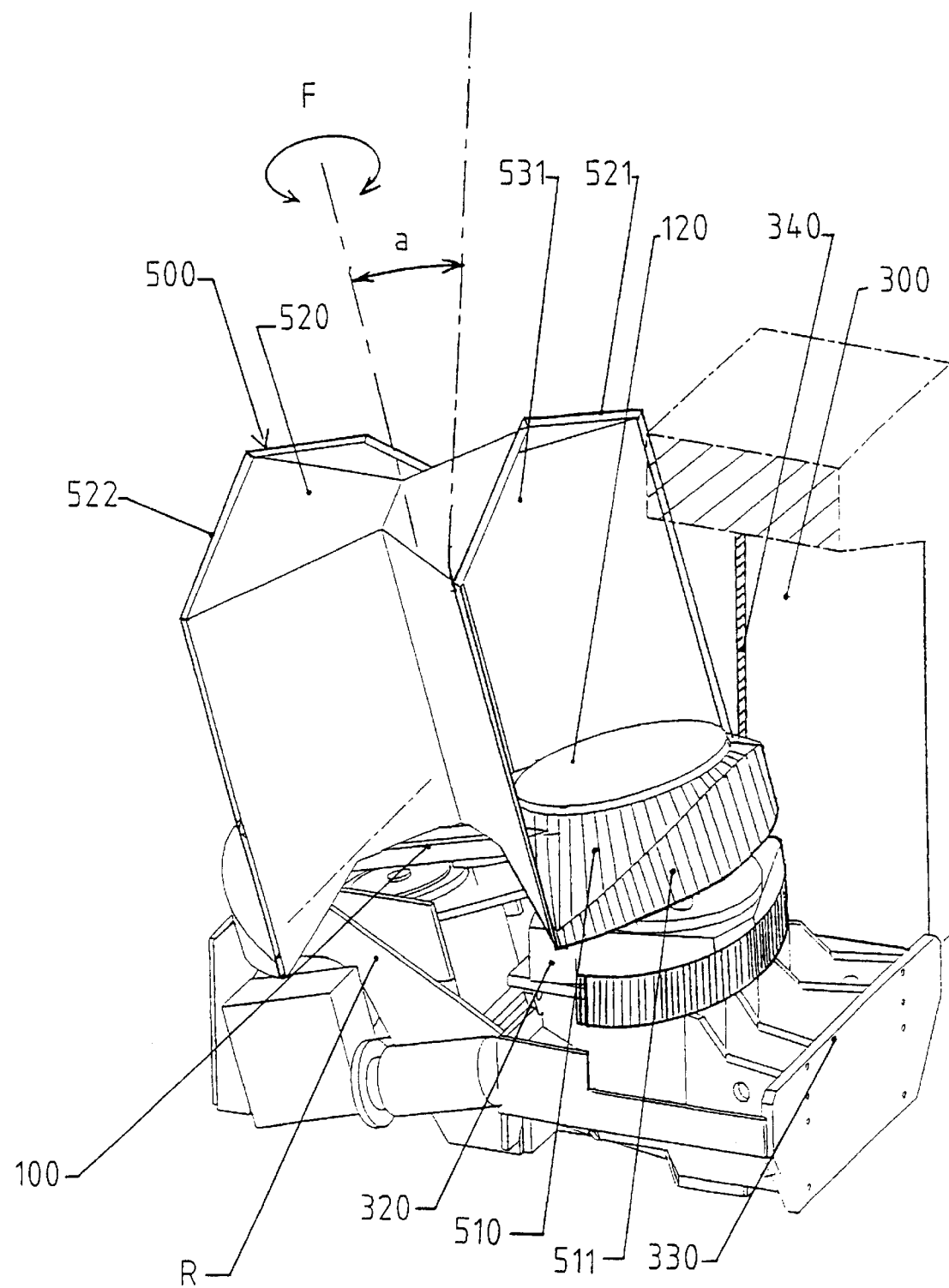
FIG. 3 is a perspective view of such a rotary device in inclined position in front of the machine tool machining station, fitted with its cover.

The drawing of FIG. 3 shows table 100 of the rotary device for changing parts R fitted with a cover 500. In fact, thanks to the tilting and freeing kinematic it provokes, the device of the invention does not only comprise standard mounting of machining but can also be equipped with an original cover to give an optimal protection guarantying the leaktightness from chips.

This cover 500 is constituted on one hand of a lower part 510 ensuring complete cover of table 100 while allowing free access from above to both pallet supports 110 and 120 of the said table, and on the other hand of an upper part 500 defining a protection shield around the said pallet supports 110 and 120 and fitted, on its vertical walls destined to be opposite machining station 300, with two openings 520 and 521 to authorize access to each pallet support 110 and 120. The function of these openings 520 and 522 arranged in the upper part of cover 500, is to allow access to the electric spindle carried by the ram 310 of machining station 300 to carry out the machining and to the loading/unloading device of the dropping module 400 of the supplying post to discharge and replace the part to be machined. The complete protection of table 100 by the lower part 510 of cover 500 has for particular advantage to protect all the kinematic part of rotary device R situated under table 100 from the projection of chips. For this purpose, this lower part 510 of cover 500 is made in the shape of a truncated cone of which the protuding lateral walls 511 protect the mechanism of the aforesaid clamping module 320 of machining station 300 of machine tool M whatever the position of the aforesaid pallets supporting table 100 (even in inclined position) and of which the wall covering table 100 around the said pallet supports 110 and 120 is made of a succession of planes 512 oriented so that the chips are led by gravity to corresponding collection troughs. So, even when table 100 is tilted to the maximum, the clamping module 320 of machining station 300, its localisation references 321 and the mechanisms of the rotary device for changing parts R are protected from the impact of chips as the inclination of planes 512 channels them by gravity, which is particularly advantageous when dry machining.

Figure 4:
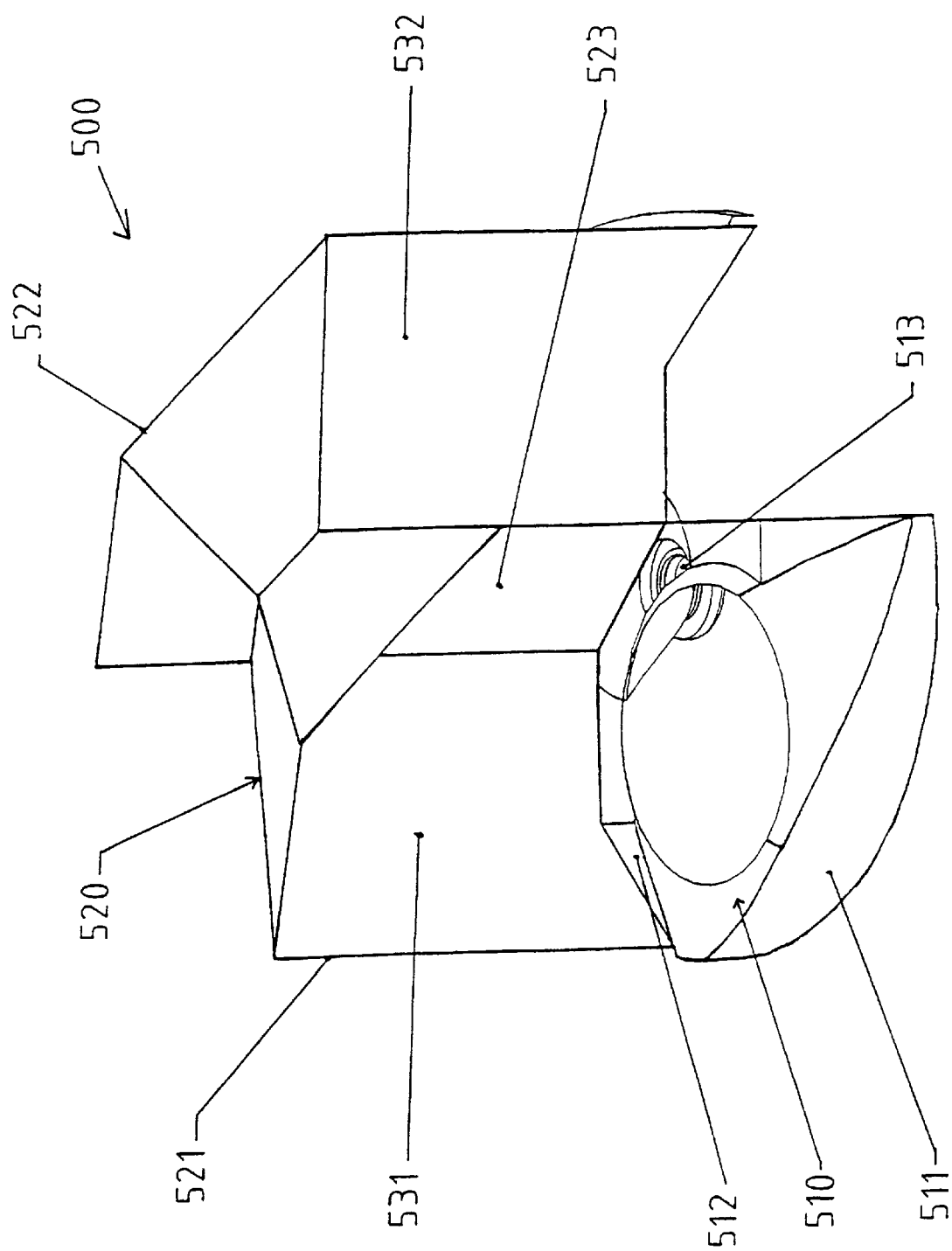
FIG. 4 is a perspective view of the cover of this rotary device on its own.

As illustrated on the drawing on FIG. 4, the aforesaid protection shield forming the upper part 520 of cover 500 is separated by a vertical partition wall 523 so as to demarcate two compartments 531 and 532 ensuring the separation between the said pallet supports 110 and 120. The advantage of separating both these pallet supports, for instance, is to avoid the projection of chips resulting from the machining of part P' fixed to a pallet 220, on the pallet support freed during the unloading and loading stage of the part-carrying pallet. The presence of chips on the pallet supports 110 or 120 could lead to a bad positioning of the pallet on its support and consequently on the references 320 of clamping module 320.

According to a particularly advantageous embodiment of the invention, the lower part 510 of cover 500 comprises a central orifice 513 situated above a collection trough and to which are oriented planes 512 situated on the inside half of each compartment 531 and 532 of the upper protection shield 520. As for the planes 512, situated in the outside half of the said compartments, they take an inclined position towards the outside of the rotary device so as to enable the discharge to a collection trough integrated to machining station 300 (see FIG. 3). The advantage of the presence of an orifice 513 in the inside part of compartments 531 and 532 of cover 500, is that it ensures the discharge of chips usually piled up there. The angular expansion "a" of table 100 has for another advantage to increase the inclination of the slopes of planes 512 situated on the inside half of the compartment concerned by the machining, thus finishing off the discharge of chips. As for the planes 512 situated on the outside part of compartments 531 and 532, they will lead the chips projected on their side towards trough 330 which can be linked to the discharging trough situated underneath central orifice 513.

The rims of the opening access 521 or 522 of each compartment 531 and 532 of the upper protection shield of the said cover 500 are demarcated in accordance with the rims of a fixed part 340 integral with the machining cubicle of the aforesaid machine tool M when part-carrying pallet 210 or 220 is in position on the clamping module 320 of machining station 300 of the machine tool so as to form a sealed parameter during machining with the said cubicle. In fact, the freeing of the pallets supporting table 100 permits a link plane by plane between cover 500 and the fixed part 340 adapting to the profile of cover 500. A plane by plane link guarantees optimal leaktighness of machining station 300 whether it be above or on the sides, a link which would be impossible to realize on the classical rotary devices as the rotation in a horizontal plane was impeded by all the surfaces in contact.

Another advantage due to the configuration of cover 500 forming a protection shield around only two pallet supports 110 and 120, is to free two symetrical spaces and to free of any element between the outside walls of both compartments expoitable for other workings with an adequate rotation of table 100 about its central axis Y.

It is understood that the description and illustration just given hereinabove of the rotary device for changing parts to be machined by a machine tool are given for the purpose of disclosure and not limitation. It is obvious that various arrangements of, as well as modifications and improvements to, the example hereinabove will be possible without departing from the scope of the invention taken in its broadest aspects and spirits.

What is claimed is:

1. Rotary device having a table and configured to change parts to be machined by a machine tool, said table comprising:
    at least two pallet supports arranged at regular angular intervals and configured to each receive a part-carrying pallet,
    wherein said table is rotatably mounted about a central axis such that said pallet supports rotate between a machining station of the machine tool and a supplying post for said part-carrying pallets arranged opposite to said machining station, and is configured to tilt between a horizontal position and an inclined position relative to the horizontal position.

2. Device according to claim 1, wherein the table is configured to tilt between the machining station of the machine tool and the supplying post of part-carrying pallets about a horizontal axis arranged orthogonally to an alignment axis of said supplying post and machining station.

3. Device according to claim 1, wherein the table is configured to tilt from its resting horizontal position where one of said pallets is positioned on reference positions of a clamping module of said machining station of the machine tool towards an inclined position above said clamping module where said one of said pallets is freed from said reference positions.

4. Device according to claim 1, wherein the rotation movement of the table is operated during the inclined position of said table.

5. Device according to claim 2, wherein the horizontal axis follows a movement in a direction parallel to a vertical plane running through the alignment axis of said supplying post and machining station.

6. Device according to claim 2, wherein the horizontal axis around which the aforesaid table tilts is situated near the supplying post.

7. Device according to claim 1, further comprising a cover comprising,
    a lower part configured to ensure complete protection of the table while leaving the pallet supports free, and
    an upper part defining a protection shield around said pallet supports and fitted with openings, configured to allow access to each pallet support, on vertical walls of said upper part destined to face the machining station.

8. Device according to claim 7, wherein the lower part of said cover is made in the shape of a truncated cone having protruding lateral walls which protect the clamping module whatever the position of the table, and having a wall covering said table around the pallet supports which is made of a succession of planes oriented so that chips of a machined part are led by gravity to corresponding collection troughs.

9. Device according to claim 7, wherein the protection shield forming the upper part of said cover is separated by a vertical partition wall so as to demarcate two compartments which ensure the separation between said pallet supports.

10. Device according to claim 9, wherein the lower part of said cover further comprises a central orifice situated above a collection trough to which is oriented planes situated in the inside of each compartment of the protection shield, said planes having an inclined position towards the outside of the rotary device so as to enable the discharge of machining chips to a collection trough.

11. Device according to claim 9, wherein the rims of the opening access of each compartment of the upper protection shield of the said cover are demarcated in accordance with the rims of a fixed part integral with the machining cubicle of the machine tool when one of said part-carrying pallets is in position on the clamping module of machining station of the machine tool so as to form a sealed area during machining with the said cubicle.

12. Device according to claim 1, wherein the connection and disconnection of the circuits used for the clamping of the pallet are subject to the tilting movement of the table for changing the parts.

* * * * *